United States Patent [19]

Heuer et al.

[11] Patent Number: 5,977,052
[45] Date of Patent: Nov. 2, 1999

[54] WASHING PROCESS USING POLYCARBOXYLIC ACID SALTS

[75] Inventors: Lutz Heuer, Dormagen; Winfried Joentgen, Köln; Torsten Groth, Odenthal; Paul Wagner, Düsseldorf; Klaus-Peter Heise, Odenthal, all of Germany

[73] Assignee: Bayer AG, Leverkusen, Germany

[21] Appl. No.: 08/983,214

[22] PCT Filed: Jul. 5, 1996

[86] PCT No.: PCT/EP96/02959

§ 371 Date: Jan. 13, 1998

§ 102(e) Date: Jan. 13, 1998

[87] PCT Pub. No.: WO97/04063

PCT Pub. Date: Feb. 6, 1997

[30] Foreign Application Priority Data

Jul. 18, 1995 [DE] Germany .......................... 195 26 089

[51] Int. Cl.⁶ ...................................................... C11D 1/08
[52] U.S. Cl. .................. 510/477; 510/276; 510/287; 510/318; 510/335; 510/361; 510/398; 510/434; 510/480; 510/488
[58] Field of Search ..................... 510/276, 287, 510/318, 335, 361, 398, 434, 477, 480, 488

[56] References Cited

U.S. PATENT DOCUMENTS

| | | | |
|---|---|---|---|
| 4,839,461 | 6/1989 | Boehmke | 528/363 |
| 4,971,724 | 11/1990 | Kalota et al. | 252/390 |
| 5,116,513 | 5/1992 | Koskan et al. | 210/698 |
| 5,389,303 | 2/1995 | Wood et al. | 252/544 |
| 5,523,023 | 6/1996 | Kleinstuck et al. | 252/542 |
| 5,531,934 | 7/1996 | Freeman et al. | 252/390 |
| 5,540,863 | 7/1996 | Wood et al. | 510/356 |
| 5,656,646 | 8/1997 | Perner et al. | 510/361 |
| 5,756,447 | 5/1998 | Hall | 510/475 |
| 5,770,553 | 6/1998 | Kroner et al. | 510/360 |

FOREIGN PATENT DOCUMENTS 4342316  6/1995  Germany .

OTHER PUBLICATIONS

Hermann G. Hauthal, *Moderne Washchmittel,* Chemie in unserer Zeit, 26. Jahrg. 1992, Nr. 6, pp. 293–303.

G. Jakobi et al., *Waschmittel chemie,* Aktuelle Themen aus Forschung und Entwicklung, 1976, pp. 91–119.

*Primary Examiner*—Yogendra Gupta
*Assistant Examiner*—Charles Boyer
*Attorney, Agent, or Firm*—Connolly Bove Lodge & Hutz LLP

[57] ABSTRACT

Textiles are washed with a liquid washing agent, softened water, and salts of at least one polycarboxylic acid. The polycarboxylic acids are present in part as sodium salt and in part as calcium or magnesium salt.

4 Claims, No Drawings

WASHING PROCESS USING POLYCARBOXYLIC ACID SALTS

The invention relates to an improved washing process and new liquid detergents.

Many processes are known for washing laundry and textiles. A detergent, as the chemical aid, and a washing machine as a mechanical aid, and water, as the medium for taking up dirt, are usually employed (wet washing). With the water, the so-called water hardness essentially formed from ions of calcium and magnesium and of sulphate, carbonate and bicarbonate, is as overall also introduced into the washing process. The salts interfere with the washing process, since they can form salts with wash-active surfactants and since they prevent or make difficult the removal of stains from the goods to be washed. The water hardness is usually reduced by additives contained in the detergent, such as polyphosphates, zeolites or laminar silicates, so-called builders. This meets two limits: phosphates are permitted to only a limited extent according to detergent legislation, and zeolites or laminar silicates, which are introduced into the wash liquor as insoluble solids, require co-builders so that they can be rinsed out, with further water, of the goods to be washed. However, the combination of builder/cobuilder itself can be rinsed out only with a minimum amount of water (50–60 l), smaller amounts of water in the main washing operation lead to deposits on the laundry.

As an alternative to using builders, however, the water can also be at least partly softened (for example ion exchangers, reverse osmosis, electrodialysis), which renders the use of builders superfluous. Problems occur here, however, with foaming, (cf. G. Jakobi, M. J. Schwuger in Waschmittelchemie [Detergents chemistry], Henkel & Cie GmbH (publisher) Düsseldorf 1976, p. 103) if softened water is used in particular (and if appropriate with an overdose of the detergent), which can destroy the machine by an electrical short-circuit. Furthermore, softened water has to date been used for all the washing operations, that is to say also the first rinsing operation, so that since very soft water rinses the soap out of the textile less well, more water must be used for rinsing.

The invention is based on the object of providing an improved washing process.

The invention relates to a washing process for washing textiles with liquid detergents using softened water and salts of at least one polycarboxylic acid, characterized in that the polycarboxylic acid is present to the extent of 1 to 90 mol % as the sodium salt and to the extent of 0.1 to 10 mol % as the calcium or magnesium salt.

According to the invention, it is possible to convert the polycarboxylic acid partly into the corresponding calcium salts or magnesium salts or to add calcium or magnesium salts to it, possible anions being, in particular, sulphate, carbonate, phosphate or chloride.

In a particularly preferred embodiment, a self-metering washing machine is used. The polycarboxylic acid are the acids usually employed as builders, for example, polyacrylates, polymaleates and, in particular, the salts of polyaspartic acids. In a particularly preferred embodiment, salts of such a polyaspartic acid which is present to the extent of more than 50%, in particular to the extent of more than 60%, as β-polyaspartic acid and has a molecular weight of >500, in particular of 1000 to 5000, measured by means of gel permeation chromatography in aqueous systems, are used.

The polyaspartic acid can be obtained here in the customary manner, for example starting from aspartic acid, and in particular starting by thermal condensation on the basis of maleic anhydride and ammonia, if appropriate via the intermediate stage of polysuccinimide, see EP-A-256,366 (=U.S. Pat. No. 4,839,461). These polyaspartic acids are used in preference to other polycarboxylic acids, since they have good washing properties as builders and cobuilders, are biologically degradable and surprisingly form water-soluble, non-crystallizing salts with calcium and/or magnesium ions (see above), and therefore do not precipitate out of liquid detergents.

The detergents to be used according to the invention preferably additionally comprise surfactants, bleaching agents and further functional constituents, such as enzymes, optical brighteners, water-glass standardizing agents, colour transfer inhibitors, dyestuffs and perfume oils. In this context, reference is made specifically, for example, to Hermann G. Hauthal, Chemie in unserer Ziet [Chemistry in our time], 1992, pp.293–303.

The following are particularly suitable for liquid metering of bleaching agents:
Hydrogen peroxide (preferred)
Sodium hypochloride
Na perborate (as a concentrated solution)
Na percarbonate (as a concentrated solution)
Na persulphate (as a concentrated solution)
Na chlorate (as a concentrated solution).

Small ($\leq 10\%$) suspendable proportions of zeolite or laminar silicate can also be added to the liquid formulation, which can be present as a solution or dispersion or emulsion, in order to introduce certain effect such as an activated surface and the like (soil redeposition on zeolite).

The calcium or magnesium salts to be used according to the invention surprisingly regulate the water hardness of the softened water via the metering in of the detergent, and thus surprisingly avoid a severe, destructive foaming.

The washing process according to the invention preferably proceeds in the following stages:

1. Preliminary washing operation (if appropriate) to me deionized water and an amount of detergent as predetermined (automatic metering)
2. Main washing operation with deionized water and an amount of detergent as measured by the development of foam in the machine (optimized amount)
3–6. Rinsing operations with water from the domestic mains
7. Last rinsing operation with deionized water.

In another preferred embodiment, steps 1, 5 and 6 are omitted.

Softened water is used only for the main washing operation and the last rinsing operation, so that no encrustation of calcium or magnesium on the laundry can occur during these operations. In contrast, the first rinsing operation comprises hard water, in order to optimize rinsing and to consume little water. A special washing machine which meters in the optimum amount of detergent in liquid form by conductivity sensors or the like, with the aid of low foaming, is preferably employed for this.

Thus:
less detergent (surfactants, bleaching agents) is used
no or only small amounts of builders based on zeolite/laminar silicate are used
less water and therefore less (heating) energy is used.

Furthermore, the amount of sodium carbonate (builder, soluble) can also be reduced, and further energy can be saved by not using zeolite/laminar silicate which are prepared from water-glass with very high expenditure of energy.

If the bleaching agent is metered in separately, it can be less in quantity, since the (oxidizable) surfactants can be partly or mostly removed metered in later than the remainder, and surfactants and the like can thus be saved.

We claim:

1. A method of regulating foam in a washing process for washing textiles with liquid detergents using softened water and salts of at least one polycarboxylic acid, wherein the polycarboxylic acid is present to the extent of 1 to 90 mol % as the sodium salt and to the extent of about 10 mol % as the calcium or magnesium salt and further wherein the salts of the polycarboxylic acid reduce the amount of foam that is generated during the washing process.

2. A method of regulating the foam in a washing process according to claim 1, characterized in that the polycarboxylic acid is a polyacrylic acid, polyacrylomaleic acid or polyaspartic acid.

3. A method of regulating the foam in a washing process according to claim 1, characterized in that the polycarboxylic acid is a polyaspartic acid, the proportion of β-linkages of which is >50% and which has a molecular weight of 500 to 5000.

4. A method of regulating the foam in a washing process according to claim 3, characterized in that the polyaspartic acid has been obtained by thermal polycondensation of maleic anhydride or maleic acid and ammonia.

* * * * *